United States Patent
Howard

(10) Patent No.: US 10,668,576 B2
(45) Date of Patent: *Jun. 2, 2020

(54) BORIC ACID FREE FLUX

(71) Applicant: Lincoln Global, Inc, City of Industry, CA (US)

(72) Inventor: Robert A. Howard, Goshen, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 282 days.

This patent is subject to a terminal disclaimer.

(21) Appl. No.: 15/646,026

(22) Filed: Jul. 10, 2017

(65) Prior Publication Data
US 2017/0304962 A1    Oct. 26, 2017

Related U.S. Application Data

(60) Division of application No. 14/211,125, filed on Mar. 14, 2014, now Pat. No. 9,700,964, which is a continuation-in-part of application No. 13/838,485, filed on Mar. 15, 2013, now Pat. No. 9,174,310.

(51) Int. Cl.
| | |
|---|---|
| *B23K 35/36* | (2006.01) |
| *B23K 35/362* | (2006.01) |
| *B23K 35/00* | (2006.01) |
| *B23K 35/02* | (2006.01) |

(52) U.S. Cl.
CPC .......... *B23K 35/3605* (2013.01); *B23K 35/00* (2013.01); *B23K 35/025* (2013.01); *B23K 35/0244* (2013.01); *B23K 35/3601* (2013.01); *B23K 35/362* (2013.01); *B23K 35/3606* (2013.01); *B23K 35/3607* (2013.01); *B23K 35/3612* (2013.01); *B23K 35/3613* (2013.01)

(58) Field of Classification Search
CPC ..... B23K 35/36; B23K 35/3605; B23K 35/00
USPC .......................................................... 148/26
See application file for complete search history.

(56) References Cited

U.S. PATENT DOCUMENTS

| | | |
|---|---|---|
| 2,197,458 A | 4/1940 | Wyler |
| 3,471,268 A | 10/1969 | Bontempelli et al. |
| 5,171,376 A | 12/1992 | Hignett et al. |
| 6,183,883 B1 | 2/2001 | Mori et al. |
| 6,613,159 B1 | 9/2003 | Koch et al. |
| 9,174,310 B2 | 11/2015 | Howard |
| 9,700,964 B2 | 7/2017 | Howard |
| 10,058,957 B2 * | 8/2018 | Howard ............. B23K 35/3605 |
| 2002/0020468 A1 | 2/2002 | Schuster et al. |
| 2009/0120533 A1 | 5/2009 | Vilborg |
| 2010/0175791 A1 | 7/2010 | Gomes |
| 2013/0059162 A1 | 3/2013 | Kobayashi et al. |
| 2017/0304963 A1 * | 10/2017 | Howard ............. B23K 35/3605 |

FOREIGN PATENT DOCUMENTS

| | | |
|---|---|---|
| CN | 1247448 A | 3/2000 |
| CN | 1273155 A | 11/2000 |
| CN | 101954552 A | 1/2011 |
| CN | 103212923 A | 7/2013 |
| DE | 10108330 A1 | 8/2002 |
| EP | 1052053 A2 | 11/2000 |
| GB | 782307 A | 9/1957 |
| GB | 1435858 A | 5/1976 |
| JP | 61-115692 A | 6/1986 |
| JP | 2000-334597 | 5/2000 |
| JP | 2016-093845 A | 5/2016 |
| JP | 2017-512654 A | 5/2017 |

OTHER PUBLICATIONS

International Search Report and Written Opinion for PCT/IB2014/000365 dated Jan. 14, 2015. Brazing Fluxes from Johnson Matthey Metals, Brazing Materials & Applications 1100:130, no date listed. Specification for Fluxes for Braze Welding, American National Standards Institute, American Welding Society, industry literature dated Feb. 17, 2012.
EP Search Report for National Phase in China of PCT/IB2015/000331 dated Apr. 23, 2018.

* cited by examiner

*Primary Examiner* — Weiping Zhu
(74) *Attorney, Agent, or Firm* — Kyu Min

(57) ABSTRACT

The invention described herein pertains generally to boric acid free flux composition in which boric acid and/or borax is substituted with a molar equivalent amount of potassium tetraborate tetrahydrate. In some embodiments, a phthalocyanine pigment is used to effect a color change at activation temperature.

18 Claims, No Drawings

BORIC ACID FREE FLUX

CROSS-REFERENCE TO RELATED APPLICATIONS

This application is a divisional of pending U.S. utility patent application Ser. No. 14/211,125, filed on Mar. 14, 2014, which is a continuation-in-part of U.S. utility patent application Ser. No. 13/838,485, filed on Mar. 15, 2013, which issued as U.S. Pat. No. 9,174,310 on Nov. 3, 2015, each of which is fully incorporated herein by reference.

TECHNICAL FIELD

The invention described herein pertains generally to boric acid free brazing flux compositions.

BACKGROUND

In general, brazing fluxes remove oxides and contaminants from base materials to ensure good quality brazed joints. The choice of flux depends on the base material to be used, in addition to the filler metal types, heat source, and application method. Brazing joins similar and dissimilar materials by heating them in the presence of filler metal having a liquidus above 425° C.-450° C. (~800° F.-840° F.) and below the solidus of the base material. During brazing, filler metal flows between fitted surfaces of the joint by capillary action. The minimum temperature on the surface of the component to be brazed at which said process takes place undisturbed is the so-called working temperature. It is a characteristic quantity for the filler metal in question. Filler metals can be alloys or pure metals. In general, the heat from brazing is less damaging than the heat from welding. Additionally, brazed joints typically have higher strength than soft-soldered joints. The choice of flux plays an important role in most all brazing processes, and the use of an incorrect flux can compromise joint quality.

In order to be able to form a bond with the base metal, the molten filler metal must come into direct contact with the base metal. Oxide layers of the kind present on any engineering metal surface must thus be loosened first and removed. If brazing takes place in the air, this is achieved by covering the brazing site with fluxes in the melt flow in which the oxides dissolve, are reduced or decompose at and above the active temperature of the flux.

When heated, fluxes dissolve surface oxides and protect the cleaned surfaces from re-oxidation, transfer heat from the heat source to the joint, and remove oxidation products, allowing filler metal to contact and wet the base materials. Brazing fluxes, pastes or powders, activate at temperatures below those needed to melt filler metals. Because fluxes must be in close contact with the joint surfaces, they are liquid or gaseous at brazing temperatures. They remove only surface oxides and tarnish. Other contaminants must be removed either mechanically or chemically before brazing.

Fluxes are typically classified by form (powder, liquid, or paste), base materials and filler metals they can be used with, heat source, application method, and active temperature range. Silver brazing fluxes contain boric acid and potassium borates, combined with complex potassium fluoborate and fluoride compounds. Fluorides, up to 40% in flux content, give these fluxes their characteristically low melting points and high capacity for dissolving metal oxides. High temperature fluxes, based on boric acid and alkaline borates, sometimes, contain small additions of elemental boron or silicon dioxide to increase activity and protection.

The melting point and the effective temperature of the fluxes must be matched to the working temperature of the brazing filler metal used, whereby the flux should melt at about 50-100° C. below the working temperature of the filler metal used and become fully effective from this temperature onwards. Moreover, the molten flux should form a dense, uniform coating on the workpiece which remains intact at the required brazing temperature and for the duration of the brazing period.

Assuming pure metal surfaces, the liquid filler metal is able to spread in a thin layer on the base metal surface, wetting it. The filler metal adheres to the base metal surface by a slight alloying of the base and filler metals. The filler metal spreads out over the joint surface and, after solidifying, forms a loadable joint with the base metal.

Brazing fluxes are composed substantially of salt mixtures which, in the molten state, are capable of dissolving metal oxides. These fluxes are substantially inorganic boron compounds such as, in particular, alkali borates and fluoroborates, including boric acid, and halides such as, in particular, an alkali halide; e.g. alkali fluorides.

Per the *Regulation (EC) No 1272/2008 of the European Parliament and of the Council on classification, labeling and packaging of substances and mixtures*" boric acid (a component of most brazing fluxes), is classified as a reproductive toxin in the European Union. This requires special labeling, leading to an effort on the part of consumers to look for boric acid free alternatives. Suitable boric acid free brazing fluxes must be developed to maintain market share and meet consumer demand.

At least one aspect of the invention resides in the superior ability to achieve desirable flux characteristics without the presence of boric acid ($H_3BO_3$) or borax ($NaB_4O_5(OH)_4 \cdot H_2O$) in the flux.

SUMMARY

The invention describes various flux compositions which do not contain boric acid, and which optionally include a color change pigment at activation temperature, e.g., a phthalocyanine pigment.

In one embodiment, a boric acid free paste flux composition is described that contains: water; potassium bifluoride ($KHF_2$); fumed silica ($SiO_2$); potassium tetraborate ($K_2B_4O_7 \cdot 4H_2O$); and potassium fluoroborate ($KBF_4$).

For high temperature applications, the boric acid free paste flux composition often contains boron.

For low temperature applications, one embodiment of the boric acid free paste flux composition contains on a weight percent basis: water (balance to total 100%); a wetting agent, preferably UDYLITE 62 (0.1-1%); potassium bifluoride ($KHF_2$) (12-16%); fumed silica ($SiO_2$) (0.1-4%); potassium tetraborate tetrahydrate ($K_2B_4O_7 \cdot 4H_2O$) (26-35%); potassium fluoroborate ($KBF_4$) (26-35%); and pigment (phthalocyanine) (0.1-2%).

For high temperature applications, another embodiment of the boric acid free paste flux composition contains on a weight percent basis: water (balance to total 100%); wetting agent, preferably UDYLITE 62 (0.1-1%); potassium bifluoride ($KHF_2$) (12-16%); fumed silica ($SiO_2$) (0.1-4%); potassium tetraborate tetrahydrate ($K_2B_4O_7 \cdot 4H_2O$) (26-35%); potassium fluoroborate ($KBF_4$) (26-35%); and boron (0.1-2%).

For powder applications, the boric acid free powder flux composition includes: potassium tetraborate ($K_2B_4O_7 \cdot 4H_2O$); potassium fluorosilicate ($K_2SiF_6$); and potassium fluoroborate ($KBF_4$).

For high temperature applications, the boric acid free powder flux will contain boron.

For high temperature applications, one embodiment of the boric acid free powder flux composition will include on a weight basis: potassium tetraborate tetrahydrate ($K_2B_4O_7 \cdot 4H_2O$) (44-54%); potassium fluorosilicate ($K_2SiF_6$) (1-3%); potassium fluoroborate ($KBF_4$) (44-54%); and boron (0.1-2%).

For low temperature applications, another embodiment of the boric acid free powder flux composition will include on a weight basis: potassium tetraborate tetrahydrate ($K_2B_4O_7 \cdot 4H_2O$) (44-54%); potassium fluorosilicate ($K_2SiF_6$) (1-3%); potassium fluoroborate ($KBF_4$) (44-54%); and pigment (phthalocyanine) (0.1-2%).

The invention includes a process of making a boric acid free flux which comprises the step of replacing boric acid present in a boric acid containing flux with a substantially similar molar amount of potassium tetraborate tetrahydrate ($K_2B_4O_7 \cdot 4H_2O$). The process optionally also includes the step of adding a phthalocyanine pigment effects a color change at an activation temperature of said flux.

The invention further includes a process of making a boric acid free flux which comprises the step of: replacing borax present in a borax containing flux with a substantially similar molar amount of potassium tetraborate tetrahydrate ($K_2B_4O_7 \cdot 4H_2O$). The process optionally also includes the step of adding a phthalocyanine pigment effects a color change at an activation temperature of said flux.

These and other objects of this invention will be evident when viewed in light of the detailed description and appended claims.

DETAILED DESCRIPTION

The best mode for carrying out the invention will now be described for the purposes of illustrating the best mode known to the applicant at the time of the filing of this invention. The examples are illustrative only and not meant to limit the invention, as measured by the scope and spirit of the claims.

As used herein, the term "approximately" or "about" means within the stated ranges with a tolerance of 10%.

The present brazing flux composition is boric acid free, provides good wetting characteristics and changes color from a color in the visible spectrum to clear at activation temperature.

The invention will now be described in a series of non-limiting, but illustrative examples.

Boric acid has a melting temperature of approximately 336° F. (169° C.) and melts early during heating in the brazing process. This allows boric acid brazing fluxes to begin melting at low temperatures, well before brazing temperature is reached, thereby protecting the faying surfaces from further oxidation. Additionally, this low melting temperature, coupled a boiling/dehydration temperature of approximately 532° F. (300° C.) helps to create brazing fluxes that hot rod well, that is to say that the flux will melt, then subsequently freeze, adhering to heated brazing rod. By the time boric acid reaches 842° F. (450° C.) it completely dehydrates (or decomposes releasing $H_2O$) leaving boron trioxide, which protects the base and filler metal surfaces throughout the remaining brazing process. Replacing boric acid in a brazing flux requires the substitution of the boric acid with one or more compounds that can approximately duplicate the above properties.

Several compounds have attributes which would lend themselves to a boric acid replacement. These options would include, at a minimum: a combination of potassium carbonate and di-ammonium phosphate; and ammonium fluoroborate or ammonium fluorosilicate and potassium tetraborate tetrahydrate. In general, sodium salts were not considered as a likely replacement due in large part to the "sodium glare" encountered when heated to brazing temperatures. In addition, sodium-borate salts were further removed from consideration because they are specified in EU "*regulation (EC) No 1272/2008 of the European Parliament and of the Council on classification, labeling and packaging of substances and mixtures*" as having the same restrictions and boric acid.

Potassium carbonate offers protection at temperatures exceeding 1600° F. (871° C.); and combining potassium carbonate with diammonium phosphate (DAP) would allow protection from oxidation above 302° F. (150° C.). However, while meeting some of the replacement criteria, it was determined that this combination was not practical for a dry powdered flux due to the deliquescence of potassium carbonate, the tendency of the flux to absorb moisture. The high dissociation partial pressure of ammonia from DAP require that the flux remain in a tightly sealed container when it is not in use, to preserve flux chemical and physical properties. The release of ammonia is also an issue with the ammonia fluoroborate and fluorosilicate; the release of ammonia is exacerbated when the paste flux is made due to the ready dissociation of ammonia from its anionic counterparts in an aqueous solution, though water gain is not an issue. Although these flux formulations yield an adequate performance, better alternatives were pursued based on at least two factors: (1) the unpleasant ammonia fume, from flux application to heating; and (2) the probable change in flux properties through hygroscopic update over time.

Potassium tetraborate is also found in brazing fluxes. It readily dissolves metallic (not refractory) oxides at high temperature almost as well as potassium pentaborate (also another replacement option) at a fraction of the cost. It was selected as an option to consider in the replacement of boric acid. Anhydrous potassium tetraborate alone does not melt until 1500° F. (816° C.) and is hygroscopic, converting to the tetrahydrate with prolonged exposure to humidity. Hydration of powdered anhydrous potassium tetraborate fluxes causes an uncontrolled change in flux properties over time and imposes unnecessary conditions and/or processing during manufacture. Hydration is an exothermic process that causes manufacturing concerns. While anhydrous powdered potassium tetraborate flux does perform adequately, the flux does not melt until the faying surface is hot enough to form additional oxides, which will subsequently need to be removed. Additionally this flux will not "hot rod" well due to the high melting temperature. For all of these reasons potassium tetraborate tetrahydrate was chosen as a preferred replacement over anhydrous potassium tetraborate as a boric acid substitute.

The invention will now be described by a series of non-limiting examples.

Example #1

In one embodiment of the invention, a black high temperature paste flux is described, the composition of which includes a mixture of water, potassium tetraborate tetrahydrate, potassium bifluoride, boron, UDYLITE (Udylite 62 is a product of Enthone®, 350 Frontage Road, West Haven, Conn.) and fumed silica in the following weight percentages.

TABLE I

High Temperature Boric Acid Free Paste Flux

| Component | Weight Percentage | |
|---|---|---|
| water | balance | |
| wetting agent (UDYLITE 62) | 0.1-1% | wetting agent/surfactant |
| potassium bifluoride (KHF$_2$) | 12-16% | etchant/clean base metal surface |
| fumed silica (SiO$_2$) | 0.1-4% | emulsifying agent/plasticizer |
| potassium tetraborate tetrahydrate (K$_2$B$_4$O$_7$•4H$_2$O) | 26-35% | dissolve metallic oxides and protect brazing surface from oxidation |
| potassium fluoroborate (KBF$_4$) | 26-35% | dissolve metallic oxides and halides and protect brazing surface from oxidation |
| boron | 0.1-2% | protect surface from oxidation at high brazing temperatures |
| Total | 100% | (all components will total 100%) |

Example #2

In another embodiment of the invention, a low temperature boric acid free paste flux will include a mixture of water, potassium bifluoride, potassium tetraborate tetrahydrate, potassium fluoroborate, pigment, UDYLITE and fumed silica in the following weight percentages.

TABLE II

Low Temperature Boric Acid Free Paste Flux

| Component | Weight Percentage | |
|---|---|---|
| water | balance | |
| wetting agent (UDYLITE 62) | 0.1-1% | wetting agent/surfactant |
| potassium bifluoride (KHF$_2$) | 12-16% | etchant/clean base metal surface |
| fumed silica (SiO$_2$) | 0.1-4% | emulsifying agent/plasticizer |
| potassium tetraborate tetrahydrate (K$_2$B$_4$O$_7$•4H$_2$O) | 26-35% | dissolve metallic oxides and protect brazing surface from oxidation |
| potassium fluoroborate (KBF$_4$) | 26-35% | dissolve metallic oxides and halides and protect brazing surface from oxidation |
| pigment (phthalocyanine) | 0.1-2% | active temperature indicator |
| Total | 100% | (all components will total 100%) |

Copper Phthalocyanine Green No. 7 was employed in several compositions as a visual indicator of activation temperature. It decomposes in the range of temperature form 1022° F. (550° C.) to 1650° F. (900° C.), depending on the level of accessible oxidizing agents. Testing revealed reliable correlation between the color change of the low temperature (green) brazing fluxes from green to clear and brazing temperature, at the faying surfaces. Furthermore this color change did not appear to be dependent on the level of pigmentation.

Example #3

In another embodiment of the invention, a high temperature boric acid free powder flux will include a mixture of potassium tetraborate tetrahydrate, potassium fluorosilicate, potassium fluoroborate and boron in the following weight percentages.

TABLE III

High Temperature Boric Acid Free Powder Flux

| Component | Weight Percentage | |
|---|---|---|
| potassium tetraborate tetrahydrate (K$_2$B$_4$O$_7$•4H$_2$O) | 44-54% | dissolve metallic oxides and protect brazing surface from oxidation |
| potassium fluorosilicate (K$_2$SiF$_6$) | 1-3% | wetting agent/surfactant |
| potassium fluoroborate (KBF$_4$) | 44-54% | dissolve metallic oxides and halides and protect brazing surface from oxidation |
| boron | 0.1-2% | protect surface from oxidation at high brazing temperatures |
| Total | 100% | (all components will total 100%) |

Example #4

In another embodiment of the invention, a low temperature boric acid free powder flux will include a mixture of potassium tetraborate tetrahydrate, potassium fluorosilicate, potassium fluoroborate and a pigment in the following weight percentages.

TABLE IV

Low Temperature Boric Acid Free Powder Flux

| Component | Weight Percentage | |
|---|---|---|
| potassium tetraborate tetrahydrate (K$_2$B$_4$O$_7$•4H$_2$O) | 44-54% | dissolve metallic oxides and protect brazing surface from oxidation |
| potassium fluorosilicate (K$_2$SiF$_6$) | 1-3% | wetting agent/surfactant |
| potassium fluoroborate (KBF$_4$) | 44-54% | dissolve metallic oxides and halides and protect brazing surface from oxidation |
| pigment (phthalocyanine 500-600° C.) | 0.1-2% | active temperature indicator |
| Total | 100% | (all components will total 100%) |

As described above, the phthalocyanine pigment is an aromatic macrocyclic compound that forms coordination complexes with many elements of the periodic table. These complexes are intensely colored which facilitates the color transformation at temperatures employed in the reaction. As described above, the phthalocyanine pigment is an aromatic macrocyclic compound that forms coordination complexes with many elements of the periodic table. These complexes are intensely colored which facilitates the color transformation at temperatures employed in the reaction from colored in the visible spectrum to essentially colorless at temperature. The phthalocyanine macrocyclic compound is illustrated below, and wherein a metallic ion would be coordination bonded to the nitrogen atoms, typically within the 5-membered rings.

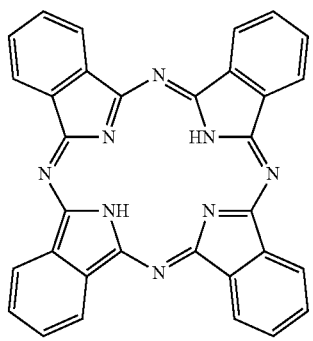 [SMILES: c1ccc2c(c1)-c1nc-2nc2[nH]c(nc3nc(nc4[nH]c(n1)c1ccccc41)-c1ccccc1-3)c1ccccc21]

The above compositions are useful for the brazing of metallic materials based on copper, silver, nickel and iron based alloys. Without being held to any one theory or mechanism of operation, the flux is used to remove the oxide layer and enable the wetting of the base materials. The activated flux creates a layer on the workpiece and removes any surface oxides. The color change at activation temperature is a distinct characteristic not seen when compared to fluxes commercially available for purchase.

Compositions and combinations of the above fluxes were tested and met all AWS A5.31M/A5.31:2012 testing standards for water content, particle, adhesion, fluidity, fluxing action, flow, life and viscosity.

The boric acid free fluxes described in Tables I-IV deliver excellent performance, standing on their own as brazing fluxes. As discussed below, the boric acid free fluxes deliver results often superior to commercially available standard fluxes that are not boric acid free.

In addition, the following tests were performed on an additional series of fluxes synthesized using the compositions identified in Tables 1-6 with the performance criteria identified and defined below being characterized in Tables 1a-6a.

Oxide Removal

All of the boric acid free fluxes dissolved all oxides from the base metal surface.

Activation Range

All of the boric acid free fluxes are fully active, removing oxides, throughout the range of 1050° F.-1600° F. (566° C.-871° C.) and 1050° F.-1800° F. (566° C.-982° C.), for the low temperature (green) flux and the high temperature flux (black) respectively.

Hot Rodding

"Hot Rodding" is the coating of a piece of brazing rod (filler metal) by dipping a hot end into a powdered flux. This is applicable to powder fluxes only. Both powder fluxes "hot rodded" extremely well.

Flux Flowability in Activation Range

A flowability test was performed per AWS A5.31M/A5.31:2012. Flowability was good for both the boric acid free powders and the pastes.

Brazing Odor and Fumes

There was very little objectionable odor and fumes throughout the brazing process for all of the boric acid free fluxes.

Activation Indicator

The pigmented fluxes of Tables 2 & 4 were the only fluxes that had a visual indicator of activation temperature actually tested.

In judging the performance of brazing flux formulations seven criteria were chosen:

(1) Hot Rod—The ability of a powder brazing flux to adhere to a hot brazing rod/wire.

(2) Flux Flow—How well the molten flux spreads, or "wets out", across the heated surface of the base-metal(s)—more specifically, how well the molten flux flows along the brazing joint capillary and the immediately adjacent faying surfaces;

(3) Metal Flow—Metal flow is an arbitrary measure of the brazing flux's ability to lower the surface tension of the molten filler metal at the base-metal surface—it is in general measured by how well the molten filler metal spreads, or "wets out", across the heated surface of the base-metal(s)—more specifically, how well the molten filler metal flows along the brazing joint capillary and the immediately adjacent faying surfaces;

(4) Acrid Odor—The quantity of fumes and smoke emitted and how irritating, sharp or pungent they are;

(5) Flux Composition—The homogeneity and ease of application;

(6) Flux Residue—The ease with which flux residue is removed; and (7) Hot Clean—The ease with which flux residue is removed using hot water alone.

Each criterion is evaluated for the flux formulation as having a subjective value between one and five, where 1 (one) is "not desirable" and 5 (five) is "desirable".

In the following examples, testing was performed on eight powdered and three paste flux test formulations of varying components and/or combined in varying ratios. Of these formulations six contained boric acid to establish several benchmarks. SSP-4 was chosen as our baseline for powdered flux (Tables 1 & 1a) and SSWF as the baseline for the paste flux (Tables 2 & 2a). None of the initial testing was for boron-containing (high temperature) fluxes. The assumption was made that a successful low temperature flux can be used as a basis for a high temperature flux. Experience with prior art compositions bear this out. Furthermore, the green phthalocyanine pigment was not included in the functional tests of the low temperature fluxes, as it is present in levels deemed too low to be of any significance to the performance of the flux, other than to provide visual indication to the operator.

Initial Powder Fluxes:

TABLE 1

| | Composition (% mass) | | | | | | | | | |
|---|---|---|---|---|---|---|---|---|---|---|
| Test No | $NH_4BF_4$ | $(NH_4)_2SiF_6$ | $H_3BO_3$ | $C_6H_8O_7$ | $K_2SiF_6$ | $(NH_4)_2PO_4$ | $K_2CO_3$ | $KBF_4$ | $KF$ | $K_2B_4O_7 \cdot 4H_2O$ |
| SSP-1 | — | — | — | — | 22 | 5 | 9 | 64 | — | — |
| SSP1-a | — | — | — | — | 21 | 6 | 10 | 63 | — | — |
| SSP1-b | — | — | — | — | 22 | 12 | 13 | 53 | — | — |
| SSP-f | — | — | 5 | 22 | — | — | 9 | 64 | — | — |
| SSP-16 | — | 10 | — | — | 30 | 10 | 20 | — | 30 | — |
| SSP-28 | 10 | 10 | — | — | — | — | — | 60 | — | 20 |

TABLE 1-continued

| | Composition (% mass) | | | | | | | | |
|---|---|---|---|---|---|---|---|---|---|
| Test No | $NH_4BF_4$ | $(NH_4)_2SiF_6$ | $H_3BO_3$ | $C_6H_8O_7$ | $K_2SiF_6$ | $(NH_4)_2PO_4$ | $K_2CO_3$ | $KBF_4$ | KF | $K_2B_4O_7 \cdot 4H_2O$ |
| SSP-6 | — | — | 15 | 5 | 20 | — | 10 | 50 | — | — |
| SSP-4 | — | — | 20 | — | 10 | — | 10 | 50 | — | — |

TABLE 1a

| Test No | Base Metal | Hot Rod | Flux Flow | Metal Flow | Acrid Odor | Flux Comp | Flux Residue | Hot Clean |
|---|---|---|---|---|---|---|---|---|
| SSP-1 | Copper | 1 | 4 | 3 | 2 | 5 | 4 | 5 |
| | Stainless | 1 | 3 | 3 | 2 | 5 | 4 | 5 |
| SSP1-a | Copper | 1 | 3 | 3 | 2 | 5 | 4 | 5 |
| | Stainless | 1 | 3 | 3 | 2 | 5 | 4 | 5 |
| SSP1-b | Copper | 1 | 3 | 4 | 1 | 4 | 3 | 4 |
| | Stainless | 1 | 3 | 3 | 2 | 4 | 3 | 4 |
| SSP-f | Copper | 2 | 3 | 3 | 2 | 3 | 3 | 3 |
| | Stainless | 2 | 3 | 4 | 2 | 3 | 3 | 4 |
| SSP-16 | Copper | 1 | 4 | 4 | 4 | 5 | 5 | 5 |
| | Stainless | 1 | 4 | 4 | 4 | 5 | 5 | 5 |
| SSP-28 | Copper | 5 | 4 | 4 | 4 | 4 | 4 | 4 |
| | Stainless | 5 | 4 | 4 | 4 | 4 | 4 | 4 |
| SSP-6 | Copper | 3 | 5 | 3 | 2 | 5 | 4 | 5 |
| | Stainless | 3 | 5 | 3 | 2 | 5 | 4 | 5 |
| SSP-4 | Copper | 4 | 5 | 3 | 3 | 5 | 4 | 5 |
| | Stainless | 4 | 5 | 3 | 3 | 5 | 4 | 5 |

Initial Paste Fluxes:

TABLE 2

| | Composition (% mass) | | | | | | | |
|---|---|---|---|---|---|---|---|---|
| Test No | $H_3BO_3$ | Udylite Copper Wetting | $(NH_4)_2PO_4$ | $KHF_2$ | $K_2CO_3$ | $KBF_4$ | KF | Water |
| SSP-11 | 10 | 20 | 10 | 10 | 20 | 30 | — | Balance |
| SSP-12 | 20 | 20 | 10 | 10 | 20 | — | 20 | Balance |
| SSWF | 41 | 0.03 | — | 18 | — | — | 18 | Balance |

TABLE 2a

| Test No | Base Metal | Hot Rod | Flux Flow | Metal Flow | Acrid Odor | Flux Comp | Flux Residue | Hot Clean |
|---|---|---|---|---|---|---|---|---|
| SSP-11 | Copper | N/A | 4 | 3 | 3 | 5 | 4 | 5 |
| | Stainless | N/A | 4 | 3 | 3 | 5 | 4 | 5 |
| SSP-12 | Copper | N/A | 5 | 3 | 2 | 5 | 4 | 5 |
| | Stainless | N/A | 5 | 3 | 2 | 5 | 4 | 5 |
| SSWF | Copper | N/A | 5 | 3 | 4 | 5 | 4 | 5 |
| | Stainless | N/A | 5 | 3 | 4 | 5 | 4 | 5 |

Potassium tetraborate is a common component in brazing fluxes. It readily dissolves metallic (not refractory) oxides at high temperature; this makes it a natural consideration for replacement of boric acid; for these reasons it was actually the chemical of first choice. Anhydrous potassium tetraborate alone does not melt until 1500° F. (816° C.) and is hygroscopic, converting to the tetrahydrate with prolonged exposure to humidity. Hydration of powdered anhydrous potassium tetraborate fluxes causes an uncontrolled change in flux properties over time and imposes unnecessary conditions and/or processing during manufacture. Hydration is an exothermic process that causes manufacturing concerns. While anhydrous powdered potassium tetraborate flux does perform adequately, the flux does not melt until the faying surface is hot enough to form some additional oxides, which will subsequently need to be removed; additionally this flux will not "hot rod" well due to the high melting temperature. For these reasons potassium tetraborate tetrahydrate was chosen as a preferred embodiment over anhydrous potassium tetraborate. Boric acid in both the powder and paste fluxes was replaced with potassium tetraborate tetrahydrate. This replacement was approximately a 1:1 molar ratio of borate content for both fluxes initially, and then adjusted against the wetting agent(s) to achieve the optimal performance.

Testing of low temperature (green) powder boric acid free flux formulations:

TABLE 3

| | Composition (% mass) | | |
|---|---|---|---|
| Test No | $K_2SiF_6$ | $KBF_4$ | $K_2B_4O_7 \cdot 4H_2O$ |
| SSP-2 | 18 | 57 | 25 |
| SSP2-a | 18 | 52 | 30 |
| SSP2-b | 20 | 40 | 40 |
| SSP2-c | 14 | 43 | 43 |
| SSP2-d | 10 | 45 | 45 |
| SSP2-e | 8 | 46 | 46 |
| SSP2-f | 6 | 47 | 47 |
| SSP2-g | 2 | 49 | 49 |

TABLE 3a

| Test No | Base Metal | Hot Rod | Flux Flow | Metal Flow | Acrid Odor | Flux Comp | Flux Residue | Hot Clean |
|---|---|---|---|---|---|---|---|---|
| SSP-2 | Copper | 2 | 4 | 4 | 2 | 5 | 4 | 5 |
| | Stainless | 2 | 3 | 3 | 2 | 5 | 4 | 5 |
| SSP2-a | Copper | 2 | 4 | 4 | 2 | 5 | 4 | 5 |
| | Stainless | 2 | 3 | 3 | 2 | 5 | 4 | 5 |
| SSP2-b | Copper | 2 | 4 | 4 | 2 | 5 | 4 | 5 |
| | Stainless | 2 | 3 | 3 | 2 | 5 | 4 | 5 |
| SSP2-c | Copper | 2 | 4 | 4 | 2 | 5 | 4 | 5 |
| | Stainless | 2 | 3 | 3 | 2 | 5 | 4 | 5 |
| SSP2-d | Copper | 3 | 4 | 4 | 2 | 5 | 4 | 5 |
| | Stainless | 3 | 3 | 4 | 2 | 5 | 4 | 5 |

TABLE 3a-continued

| Test No | Base Metal | Hot Rod | Flux Flow | Metal Flow | Acrid Odor | Flux Comp | Flux Residue | Hot Clean |
|---|---|---|---|---|---|---|---|---|
| SSP2-e | Copper | 3 | 4 | 4 | 3 | 5 | 4 | 5 |
|  | Stainless | 3 | 3 | 4 | 3 | 5 | 4 | 5 |
| SSP2-f | Copper | 4 | 4 | 5 | 4 | 5 | 4 | 5 |
|  | Stainless | 4 | 4 | 4 | 4 | 5 | 4 | 5 |
| SSP2-g | Copper | 5 | 5 | 5 | 4 | 5 | 4 | 5 |
|  | Stainless | 5 | 5 | 5 | 4 | 5 | 4 | 5 |

Testing of high temperature (black) powder boric acid free flux formulations:

TABLE 4

| Test No | Composition (% mass) | | | |
|---|---|---|---|---|
|  | Boron | $K_2SiF_6$ | $KBF_4$ | $K_2B_4O_7 \cdot 4H_2O$ |
| SSP2-h | 5 | 5 | 50 | 40 |
| SSP2-i | 4 | 6 | 48 | 42 |
| SSP-j | 3 | 3 | 46 | 46 |
| SSP-k | 2 | 3 | 47 | 47 |
| SSP-l | 2 | 3 | 48 | 48 |
| SSP-m | 1 | 3 | 48 | 48 |

TABLE 4a

| Test No | Base Metal | Hot Rod | Flux Flow | Metal Flow | Acrid Odor | Flux Comp | Flux Residue | Hot Clean |
|---|---|---|---|---|---|---|---|---|
| SSP2-h | Copper | 1 | 2 | 3 | 3 | 5 | 3 | 5 |
|  | Stainless | 1 | 2 | 3 | 3 | 5 | 2 | 4 |
| SSP2-i | Copper | 2 | 2 | 3 | 3 | 5 | 3 | 5 |
|  | Stainless | 2 | 2 | 3 | 3 | 5 | 2 | 4 |
| SSP-j | Copper | 3 | 2 | 3 | 3 | 5 | 3 | 5 |
|  | Stainless | 3 | 2 | 4 | 3 | 5 | 3 | 5 |

TABLE 4a-continued

| Test No | Base Metal | Hot Rod | Flux Flow | Metal Flow | Acrid Odor | Flux Comp | Flux Residue | Hot Clean |
|---|---|---|---|---|---|---|---|---|
| SSP-k | Copper | 3 | 3 | 3 | 3 | 5 | 4 | 5 |
|  | Stainless | 3 | 3 | 4 | 3 | 5 | 3 | 5 |
| SSP-l | Copper | 4 | 4 | 4 | 4 | 5 | 4 | 5 |
|  | Stainless | 4 | 4 | 4 | 4 | 5 | 4 | 5 |
| SSP-m | Copper | 5 | 5 | 5 | 4 | 5 | 4 | 5 |
|  | Stainless | 5 | 5 | 5 | 4 | 5 | 4 | 5 |

Testing of low temperature (green) paste boric acid free flux formulations:

TABLE 5

| Test No | Composition (% mass) | | | | | |
|---|---|---|---|---|---|---|
|  | Fumed $SiO_2$ | Udylite Copper Wetting | $KHF_2$ | $KBF_4$ | $K_2B_4O_7 \cdot 4H_2O$ | Water |
| SSP-48 | 2 | 1 | 23 | 23 | 28 | Balance |
| SSP48-A | 2 | 1 | 20 | 23 | 30 | Balance |
| SSP48-B | 1 | 0.75 | 15 | 30 | 31 | Balance |
| SSP-C | 1 | 0.05 | 15 | 32 | 32 | Balance |
| SSP-D | 1 | 0.5 | 14 | 32 | 32 | Balance |

TABLE 5a

| Test No | Base Metal | Hot Rod | Flux Flow | Metal Flow | Acrid Odor | Flux Comp | Flux Residue | Hot Clean |
|---|---|---|---|---|---|---|---|---|
| SSP-48 | Copper | N/A | 2 | 3 | 2 | 4 | 4 | 3 |
|  | Stainless | N/A | 2 | 2 | 2 | 4 | 4 | 3 |
| SSP48-a | Copper | N/A | 3 | 3 | 2 | 4 | 4 | 4 |
|  | Stainless | N/A | 2 | 3 | 2 | 4 | 4 | 4 |
| SSP48-b | Copper | N/A | 3 | 3 | 2 | 4 | 4 | 4 |
|  | Stainless | N/A | 3 | 3 | 2 | 4 | 4 | 4 |
| SSP-c | Copper | N/A | 4 | 4 | 3 | 4 | 4 | 5 |
|  | Stainless | N/A | 4 | 3 | 3 | 4 | 4 | 5 |
| SSP-d | Copper | N/A | 5 | 5 | 4 | 5 | 4 | 5 |
|  | Stainless | N/A | 5 | 5 | 4 | 5 | 4 | 5 |

Testing of high temperature (black) paste boric acid free flux formulations:

TABLE 6

| Test No | Composition (% mass) | | | | | | |
|---|---|---|---|---|---|---|---|
|  | Boron | Fumed $SiO_2$ | Udylite Copper Wetting | $KHF_2$ | $KBF_4$ | $K_2B_4O_7 \cdot 4H_2O$ | Water |
| SSP-50 | 4 | 2 | 2 | 25 | 38 | 28 | Balance |
| SSP50-a | 3 | 2 | 2 | 23 | 36 | 29 | Balance |
| SSP50-b | 2 | 1 | 1 | 17 | 35 | 30 | Balance |
| SSP50-c | 1 | 1 | 0.75 | 15 | 33 | 31 | Balance |
| SSP50-d | 1 | 1 | 0.5 | 14 | 32 | 32 | Balance |

TABLE 6a

| Test No | Base Metal | Hot Rod | Flux Flow | Metal Flow | Acrid Odor | Flux Comp | Flux Residue | Hot Clean |
|---|---|---|---|---|---|---|---|---|
| SSP-50 | Copper | N/A | 3 | 3 | 2 | 4 | 4 | 4 |
|  | Stainless | N/A | 2 | 3 | 2 | 4 | 4 | 4 |
| SSP50-a | Copper | N/A | 3 | 3 | 3 | 4 | 4 | 4 |
|  | Stainless | N/A | 3 | 3 | 3 | 4 | 4 | 4 |
| SSP50-b | Copper | N/A | 4 | 4 | 3 | 4 | 4 | 5 |
|  | Stainless | N/A | 3 | 4 | 3 | 4 | 4 | 4 |
| SSP50-c | Copper | N/A | 4 | 5 | 4 | 5 | 4 | 5 |
|  | Stainless | N/A | 4 | 4 | 4 | 5 | 4 | 5 |
| SSP50-d | Copper | N/A | 5 | 5 | 4 | 5 | 4 | 5 |
|  | Stainless | N/A | 5 | 5 | 4 | 5 | 4 | 5 |

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A boric acid-free paste flux composition, comprising:
    water;
    potassium bifluoride;
    a fumed silica;
    potassium tetraborate tetrahydrate; and
    potassium fluoroborate.

2. The boric acid-free paste flux composition of claim 1, further comprising boron.

3. The boric acid-free paste flux composition of claim 2, further comprising a wetting agent.

4. The boric acid-free paste flux composition of claim 3, comprising approximately on the basis of the total weight of the boric acid-free paste flux composition:
    the wetting agent in the amount of 0.1-1 weight %;
    potassium bifluoride in the amount of 12-16 weight %;
    the fumed silica in the amount of 0.1-4 weight %;
    potassium tetraborate tetrahydrate in the amount of 26-35 weight %,
    potassium fluoroborate in the amount of 26-35 weight %;
    boron in the amount of 0.1-2 weight %; and
    water in the amount of balance.

5. The boric acid-free paste flux composition of claim 4, wherein the boric acid-free paste flux composition is a high temperature boric acid-free paste flux composition.

6. The boric acid-free paste flux composition of claim 1, further comprising a wetting agent.

7. The boric acid-free paste flux composition of claim 6, further comprising a pigment comprising phthalocyanine.

8. The boric acid-free paste flux composition of claim 7, on the basis of the total weight of the boric acid-free paste flux composition:
    the wetting agent in the amount of 0.1-1 weight %;
    potassium bifluoride in the amount of 12-16 weight %;
    the fumed silica in the amount of 0.1-4 weight %;
    potassium tetraborate tetrahydrate in the amount of 26-35 weight %;
    potassium fluoroborate in the amount of 26-35 weight %;
    the pigment in the amount of 0.1-2 weight %; and
    water in the amount of balance.

9. The boric acid-free paste flux composition of claim 8, wherein the boric acid-free paste flux composition is a low temperature boric acid-free paste flux composition.

10. The boric acid-free paste flux composition of claim 1, further comprising a pigment comprising phthalocyanine.

11. The boric acid-free paste flux composition of claim 10, wherein the phthalocyanine pigment changes from colored to colorless at a temperature of approximately 500-600° C.

12. The boric acid-free paste flux composition of claim 1, further comprising:
    a pigment comprising phthalocyanine;
    a wetting agent; and
    boron.

13. The boric acid-free paste flux composition of claim 1, wherein the boric acid-free composition comprises, on the basis of the total weight of the boric acid-free paste flux composition, one or more of the following amounts:
    potassium bifluoride in the amount of 12-16 weight %;
    the fumed silica in the amount of 0.1-4 weight %;
    potassium tetraborate tetrahydrate in the amount of 26-35 weight %; and
    potassium fluoroborate in the amount of 26-35 weight %.

14. The boric acid-free paste flux composition of claim 1, further comprising a pigment.

15. The boric acid-free paste flux composition of claim 14, wherein the pigment comprises phthalocyanine.

16. The boric acid-free paste flux composition of claim 1, wherein the boric acid-free composition further comprises, on the basis of the total weight of the boric acid-free paste flux composition, a wetting agent in the amount of 0.1-1 weight %.

17. The boric acid-free paste flux composition of claim 1, wherein the boric acid-free composition further comprises, on the basis of the total weight of the boric acid-free paste flux composition, boron in the amount of 0.1-2 weight %.

18. The boric acid-free paste flux composition of claim 1, wherein the boric acid-free composition further comprises, on the basis of the total weight of the boric acid-free paste flux composition, a pigment in the amount of 0.1-2 weight %.

* * * * *